US012466600B2

(12) United States Patent
Nishimoto et al.

(10) Patent No.: US 12,466,600 B2
(45) Date of Patent: Nov. 11, 2025

(54) RELEASING/AFFIXING DEVICE AND RELEASING/AFFIXING SYSTEM

(71) Applicant: FUJI CORPORATION, Chiryu (JP)

(72) Inventors: Takeshi Nishimoto, Fuso-cho (JP); Kazuaki Mori, Anjo (JP)

(73) Assignee: FUJI CORPORATION, Chiryu (JP)

( * ) Notice: Subject to any disclaimer, the term of this patent is extended or adjusted under 35 U.S.C. 154(b) by 105 days.

(21) Appl. No.: 18/546,165

(22) PCT Filed: Feb. 16, 2021

(86) PCT No.: PCT/JP2021/005664

§ 371 (c)(1),
(2) Date: Aug. 11, 2023

(87) PCT Pub. No.: WO2022/176008

PCT Pub. Date: Aug. 25, 2022

(65) Prior Publication Data

US 2024/0043158 A1 Feb. 8, 2024

(51) Int. Cl.

*B32B 41/00* (2006.01)
*B65C 9/26* (2006.01)
*B65C 9/40* (2006.01)

(52) U.S. Cl.

CPC . *B65C 9/26* (2013.01); *B65C 9/40* (2013.01)

(58) Field of Classification Search

CPC ............ B65C 9/26; B65C 9/40; B65C 9/0006
USPC .................... 156/60, 64, 350, 351, 378, 379
See application file for complete search history.

(56) References Cited

U.S. PATENT DOCUMENTS

2022/0063112 A1* 3/2022 Nishigaito ........... B25J 15/0616

FOREIGN PATENT DOCUMENTS

| | | | |
|---|---|---|---|
| JP | 4-112010 | U | 9/1992 |
| JP | 11-87547 | A | 3/1999 |
| JP | 2002-274516 | A | 9/2002 |
| JP | 2008290727 | A | * 12/2008 |
| JP | 2018-15846 | A | 2/2018 |

OTHER PUBLICATIONS

International Search Report issued Apr. 13, 2021 in PCT/JP2021/005664, filed on Feb. 16, 2021, 2 pages.

* cited by examiner

*Primary Examiner* — Michael N Orlando
*Assistant Examiner* — Joshel Rivera
(74) *Attorney, Agent, or Firm* — Oblon, McClelland, Maier & Neustadt, L.L.P.

(57) ABSTRACT

A releasing/affixing device is a releasing/affixing device configured to move a seal from a sheet to which one or more seals are affixed, the device includes a base section, a pickup section disposed in the base section and configured to pick up a part of the seal, a gripping section disposed in the base section to be movable in a direction approaching and separating from the pickup section, configured to be movable in an up-down direction where the base section is lifted and lowered, and configured to grip an end portion of the seal, and a drive section configured to drive the gripping section in the direction approaching and separating from the pickup section.

16 Claims, 12 Drawing Sheets

RELEASING/AFFIXING DEVICE AND RELEASING/AFFIXING SYSTEM

TECHNICAL FIELD

The present description discloses a releasing/affixing device and a releasing/affixing system.

BACKGROUND ART

Conventionally, as a seal sticking device, for example, a device is proposed in which a seal is released from a mount by a first hand and a second hand, a held seal is moved to an imaging position, and an outer shape of the seal in a captured image is matched with an ideal seal shape to cancel deformation of the seal (for example, Patent Literature 1). In this device, a flexible seal can be released from the mount by a robot hand, and the released seal can be stuck on a desired sticking position.

PATENT LITERATURE

Patent Literature 1: JP-A-2018-15846

BRIEF SUMMARY

Technical Problem

However, in the above-described seal sticking device, the first hand and the second hand need to be separately controlled, and labor is required for position control for releasing processing, moving processing, and affixing processing of the seal. In this manner, there is a demand for a device capable of more surely releasing, moving, and affixing the seal affixed to a sheet.

The present disclosure has been made in view of such problems, and the main object thereof is to provide a releasing/affixing device and a releasing/affixing system that can more surely move a seal from an affixed sheet.

Solution to Problem

A releasing/affixing device disclosed in the present description has adopted the following means in order to achieve the above-described main object.

A releasing/affixing device of the present disclosure is a releasing/affixing device configured to move a seal from a sheet to which one or more seals are affixed, the device including a base section, a pickup section disposed in the base section and configured to pick up a part of the seal, a gripping section disposed in the base section to be movable in a direction approaching and separating from the pickup section, configured to be movable in an up-down direction where the base section is lifted and lowered, and configured to grip an end portion of the seal, and a drive section configured to drive the gripping section in the direction approaching and separating from the pickup section.

In the releasing/affixing device, the pickup section and the gripping section are disposed in the base section, a positional relationship between the pickup section and the gripping section can be uniquely obtained, and the seal can be released, moved, and affixed in a state where a part of the seal is picked up and the end portion of the seal is gripped. Therefore, in the releasing/affixing device, the seal can be more surely moved from the affixed sheet.

DESCRIPTION OF EMBODIMENTS

Figure 1:
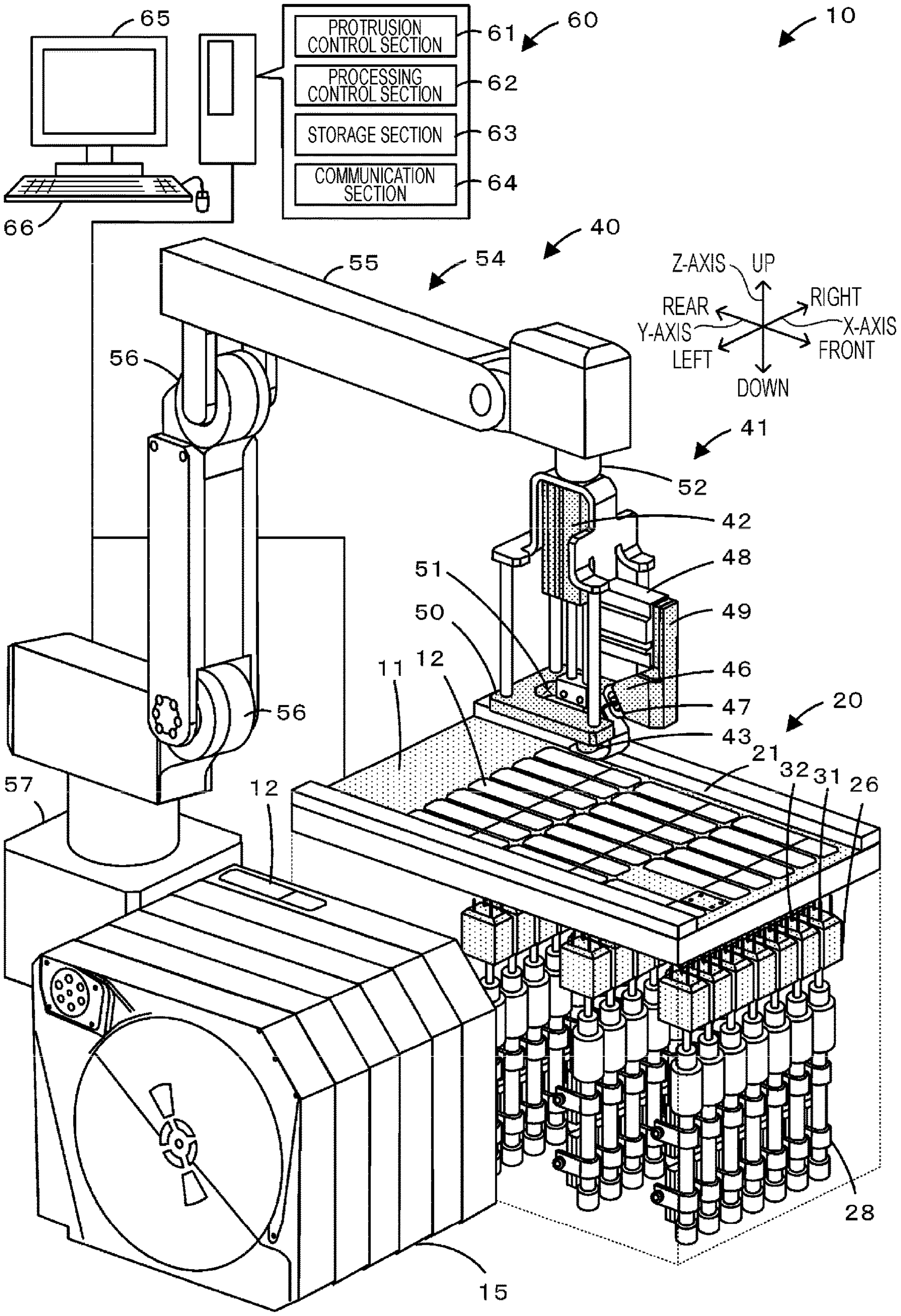
FIG. 1 is a schematic explanatory view illustrating an example of releasing/affixing system 10.
Figure 2:
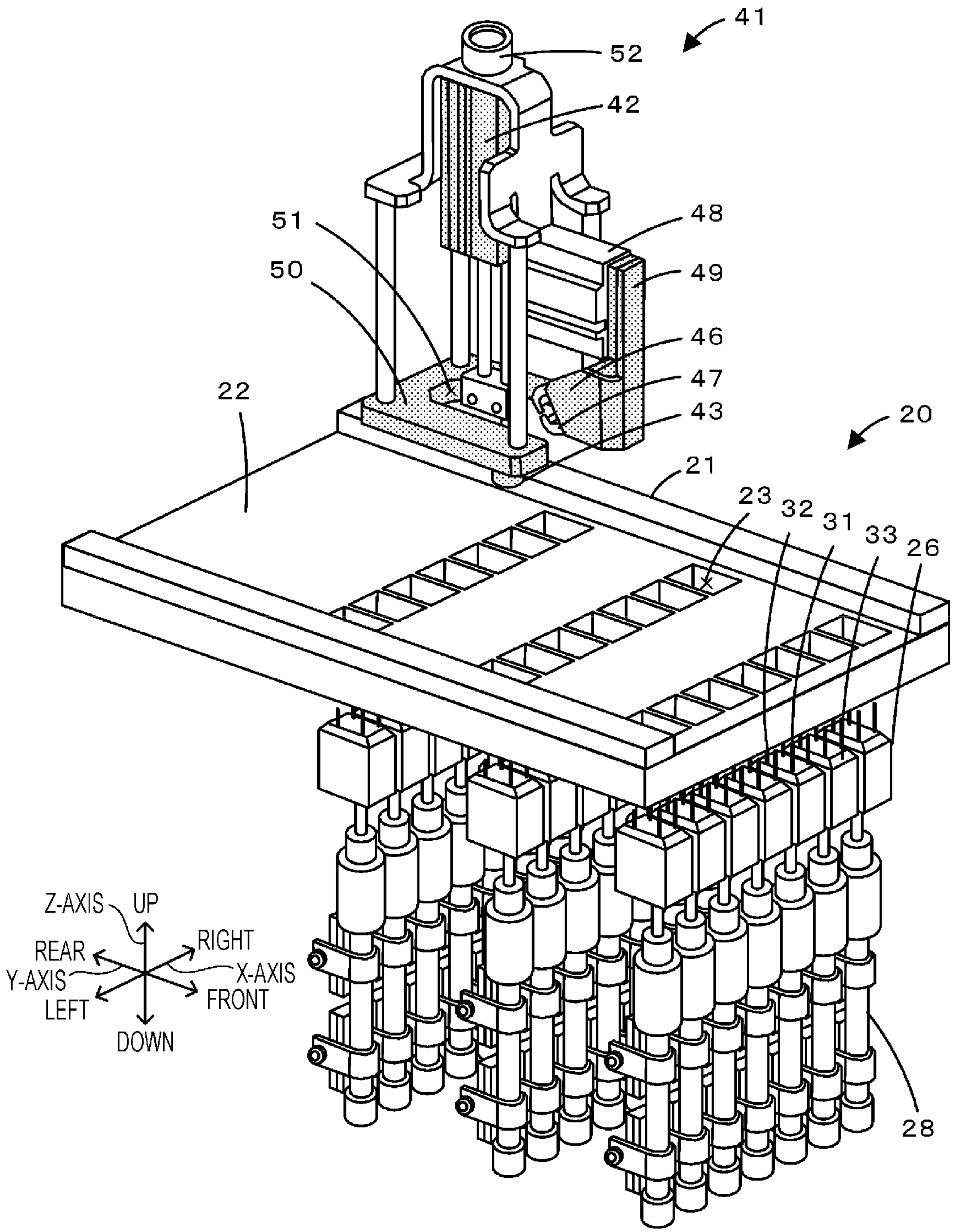
FIG. 2 is a perspective view of protrusion device 20 and releasing/affixing mechanism 41.
Figure 3:
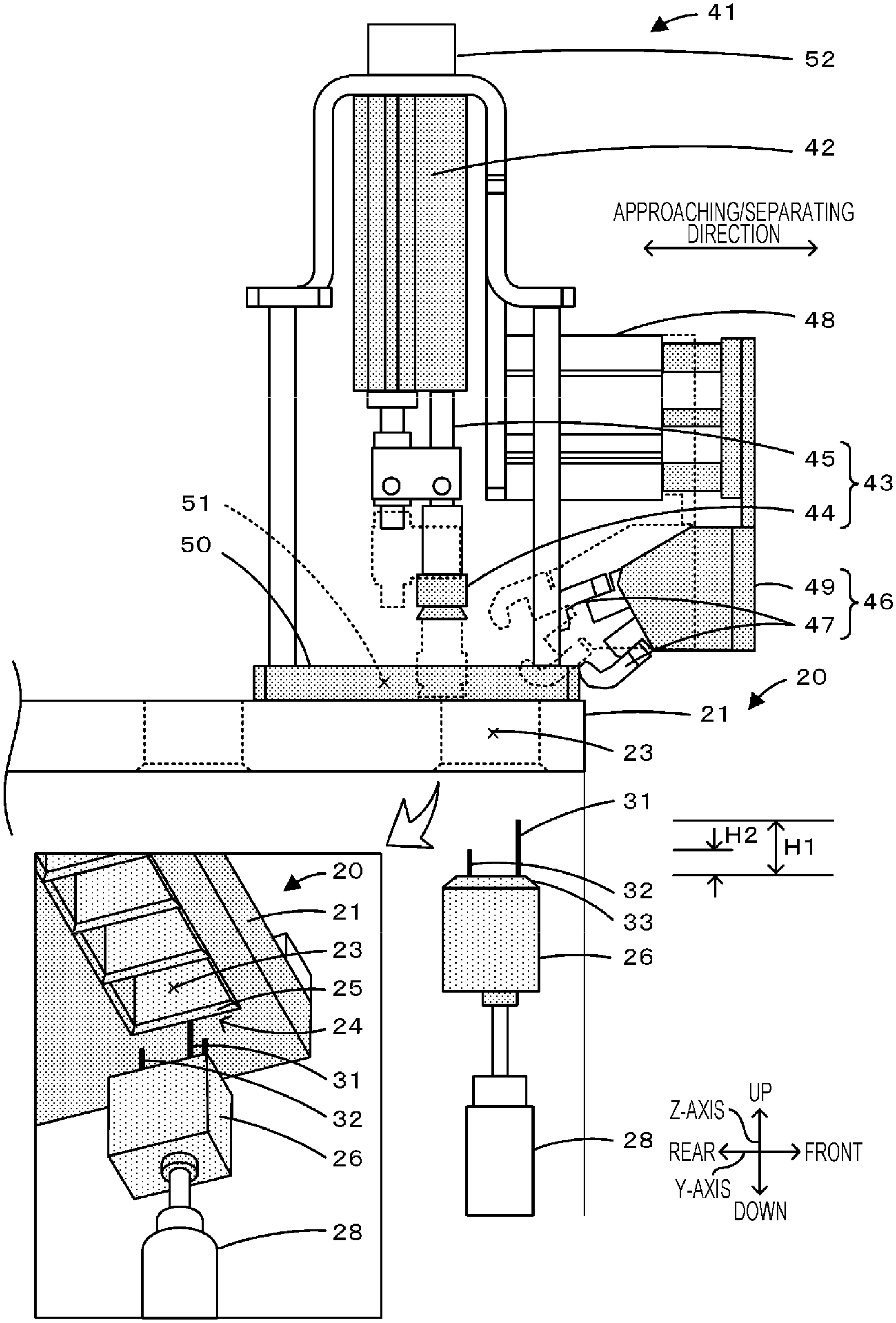
FIG. 3 is a side view of protrusion device 20 and releasing/affixing mechanism 41.
Figure 4:
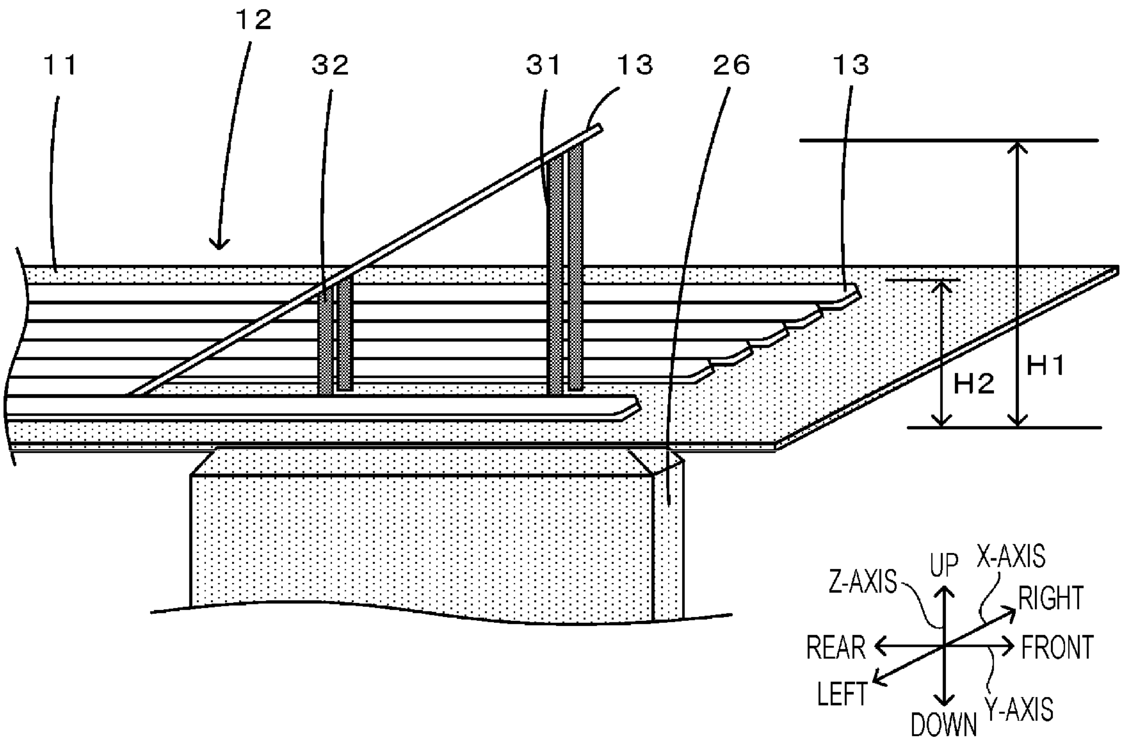
FIG. 4 is an explanatory view of push-up section 26.
Figure 5:
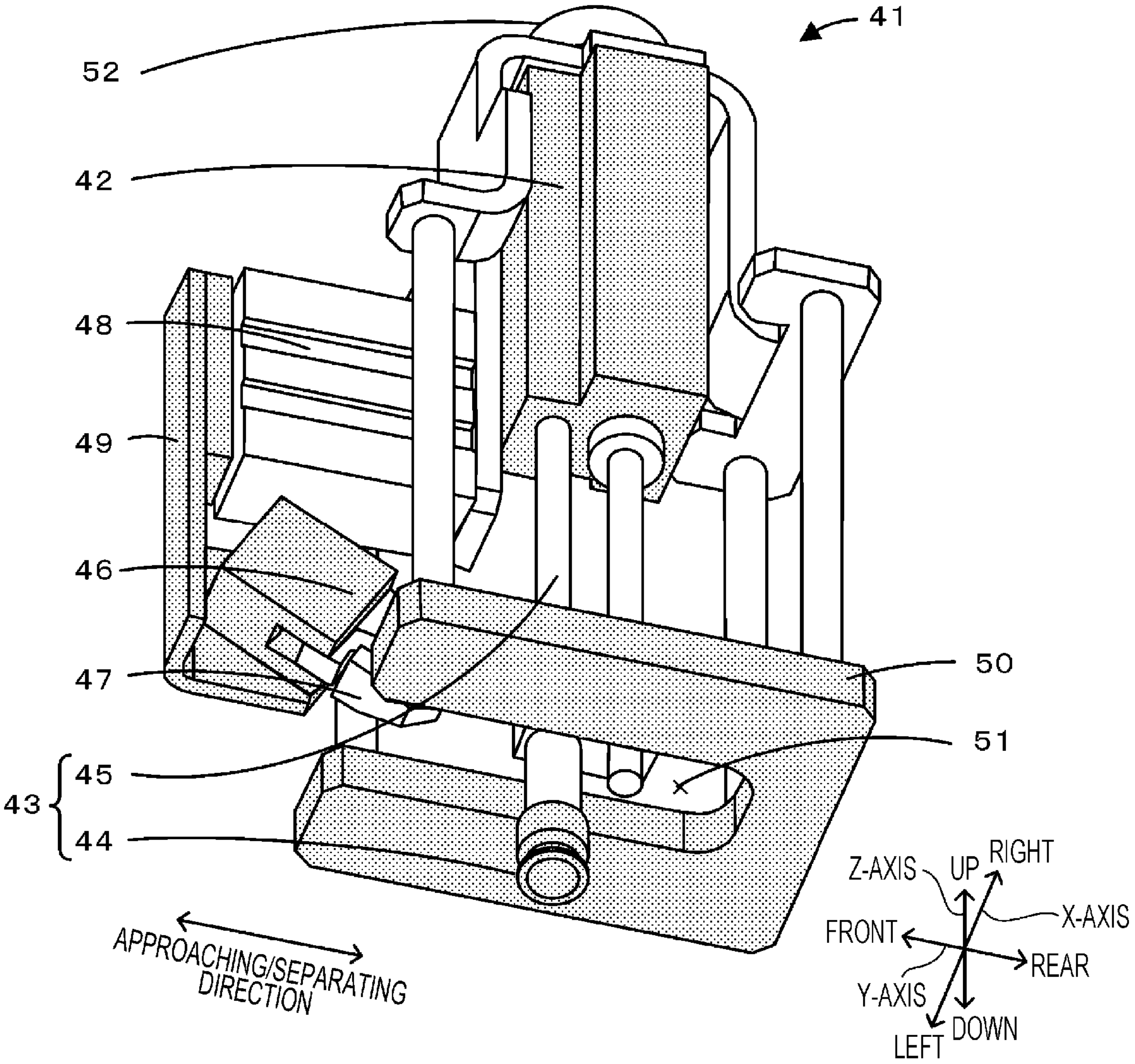
FIG. 5 is a perspective view of releasing/affixing mechanism 41.
Figure 6:
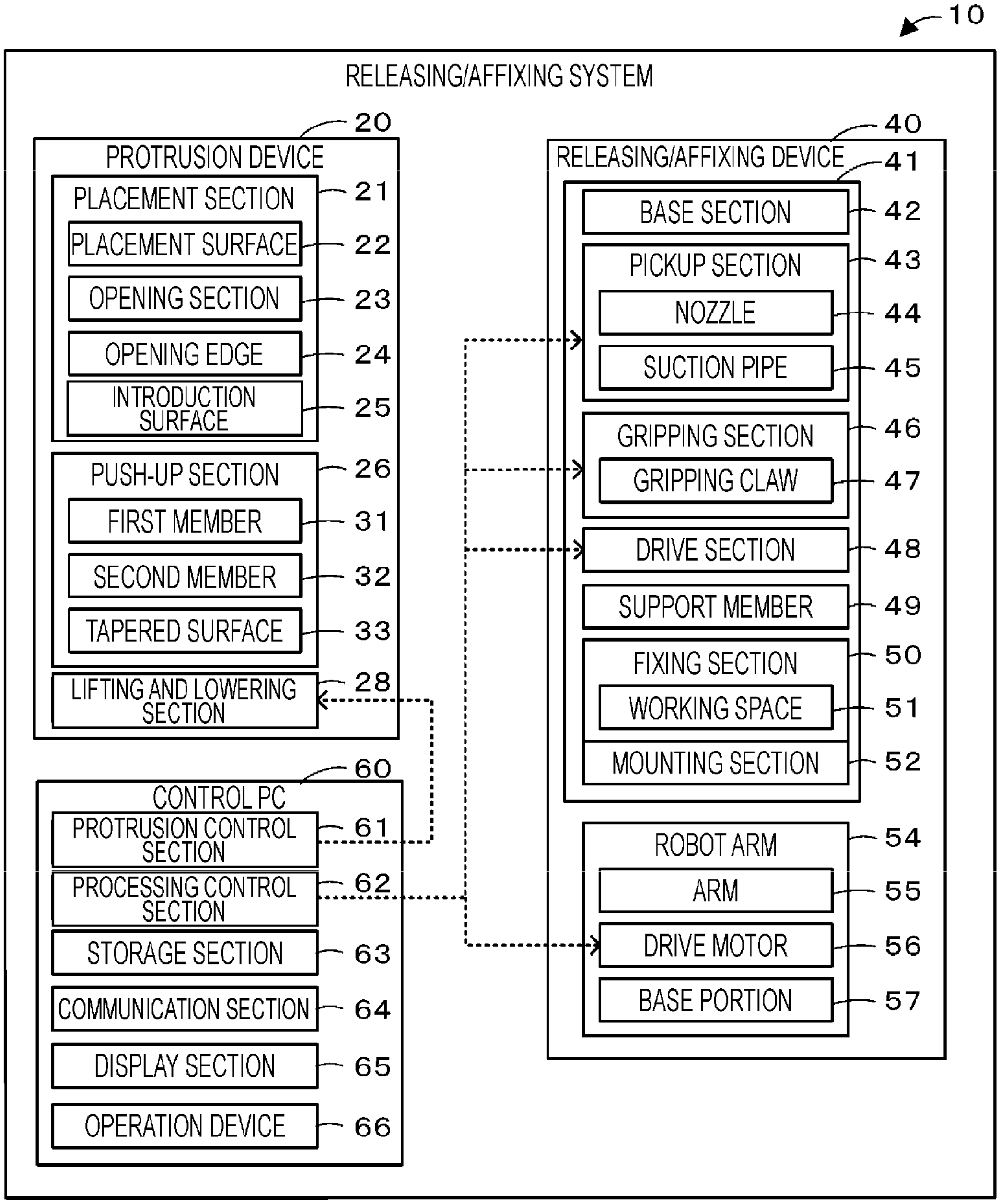
FIG. 6 is a block diagram illustrating an electrical connection relationship of releasing/affixing system 10.

Hereinafter, the present embodiment will be described with reference to drawings. FIG. 1 is a schematic explanatory view illustrating an example of releasing/affixing system 10. FIG. 2 is a perspective view of protrusion device 20 and releasing/affixing mechanism 41. FIG. 3 is a side view of protrusion device 20 and releasing/affixing mechanism 41. FIG. 4 is an explanatory view of push-up section 26. FIG. 5 is a perspective view of releasing/affixing mechanism 41. FIG. 6 is a block diagram illustrating an electrical connection relationship of releasing/affixing system 10. Releasing/affixing system 10 is, for example, a system configured to execute processing of releasing and moving one or more seals 12 attached to sheet 11 one by one and affixing seal 12 to an affixing target. Releasing/affixing system 10 is provided with protrusion device 20, releasing/affixing device 40, and control PC 60. In the present embodiment, the left-right direction (X-axis), the front-rear direction (Y-axis), and the up-down direction (Z-axis) are as illustrated in FIGS. 1 to 5. Here, for convenience, the direction where seal 12 is pushed up is defined as “front”, and the direction where seal 12 is affixed to sheet 11 is defined as “rear”, which will be described as the front-rear direction.

For example, seal 12 may be one in which information relating to the affixing target is formed. Examples of the information relating to the affixing target include identification information, the price of the affixing target, and performance. In addition, the information formed on seal 12 may be, for example, a character, a symbol, a figure, or the like, or may be a bar code, a two-dimensional code, or the like. Affixing target 15 is not particularly limited as long as seal 12 is affixed, and examples thereof include an industrial article including a machine, a device, a unit of a device, a component, a daily necessity article generally used, a food, a perishable article, and the like. FIG. 1 illustrates a feeder used in a mounting device for mounting a component on a board and on which a tape holding the component is mounted, as an example of affixing target 15.

Protrusion device 20 is a device that thrusts seal 12 from sheet 11 to which one or more seals 12 are affixed, and releases an end portion thereof. As illustrated in FIGS. 1 to 4, protrusion device 20 is provided with placement section 21, push-up section 26, and lifting and lowering section 28.

Placement section 21 is a plate-like member on which sheet 11 is placed, and includes placement surface 22 and opening section 23. Placement surface 22 is an upper surface of placement section 21 and is a rectangular surface on which sheet 11 is placed. Opening section 23 is a space that communicates from placement surface 22, which is the upper surface of placement section 21, to a lower surface side, and into which push-up section 26 is inserted. Opening section 23 is formed by a rectangular surface into which rectangular parallelepiped push-up section 26 can be inserted. As illustrated in FIG. 3, opening edge 24 on the lower surface side of opening section 23 is formed with introduction surface 25 for guiding push-up section 26 to an inner space of opening section 23. Introduction surface 25 is a surface formed in a tapered shape whose opening area decreases from the lower surface toward the upper surface side. Push-up section 26 is guided by introduction surface 25 to move to the inside of opening section 23 and is positioned.

As illustrated in FIG. 4, push-up section 26 is a member that pushes up leading end portion 13 of seal 12 to release leading end portion 13 of seal 12. Push-up section 26 releases leading end portion 13 from sheet 11 in a state where a side different from leading end portion 13 of seal 12 is affixed to sheet 11. As illustrated in FIGS. 1 and 2, push-up section 26 is arranged on the lower surface side of each of multiple seals 12. Push-up section 26 includes first member 31 and second member 32 that push up seal 12 from the lower surface side. First member 31 is a member disposed in front of the upper surface of push-up section 26 and formed at predetermined height H1 to push up the leading end portion of seal 12 from below. Second member 32 is a member disposed on the rear side of the upper surface of push-up section 26, has height H2 lower than height H1 of first member 31, is located on the center side from the leading end portion of the seal, and pushes up seal 12 from below. First member 31 and second member 32 push up seal 12 from the lower surface side through sheet 1. First member 31 is two first pins for pushing up a corner portion of leading end portion 13 of seal 12 from below, and second member 32 is two second pins for pushing up a center side from the leading end portion of seal 12. "Corner portion" refers to a region including a corner of leading end portion 13 (for example, a few millimeters square or the like). In push-up section 26, disposed are first member 31 and second member 32 having such a height that the seal is linearly inclined with a first end side of seal 12 serving as a starting point and a second end side of seal 12 is located at a high position. In addition, push-up section 26 may be provided with first member 31 and second member 32 at a height and a position where second member 32 pushes up seal 12 from the lower surface side at a timing when leading end portion 13 of seal 12 is detached from first member 31 when push-up section 26 is lifted. In push-up section 26, since leading end portion 13 is pushed up in a state where one end portion is affixed to seal 12, leading end portion 13 is lifted in an arc, so that the tip end of first member 31 is detached from leading end portion 13 when a certain height is exceeded as first member 31 is lifted. In such first member 31, since the force is not continuously applied to leading end portion 13 of seal 12, it is possible to further suppress the breakage and the like. In addition, push-up section 26 is formed with tapered surface 33 at an upper end portion, which is inclined such that an area of the upper surface decreases upward. Tapered surface 33 is a surface in contact with opening edge 24 of opening section 23, and push-up section 26 is guided to the inside of opening section 23 by contacting introduction surface 25 and tapered surface 33 together with the lift, and is positioned at opening section 23.

Lifting and lowering section 28 moves push-up section 26 up and down between a standby position on the lower surface side of placement section 21 and a push-up position in which leading end portion 13 of seal 12 is pushed up. Lifting and lowering section 28 may be an air cylinder. Since the air cylinder has a margin in front-rear, and left-right directions when lifted, push-up section 26 can be inserted into opening section 23 even when a dimensional deviation exists between a fixed position of lifting and lowering section 28 and an installation position of opening section 23.

Releasing/affixing device 40 is a device that releases seal 12 from sheet 11 to which one or more seals 12 are affixed, moves, and then affixes seal 12 to affixing target 15. Releasing/affixing device 40 includes releasing/affixing mechanism 41 and robot arm 54. Releasing/affixing mechanism 41 is a principal portion of releasing/affixing device 40 that moves seal 12, and is configured as an end effector mounted on the tip end of robot arm 54 in a state of being capable of being dismounted. Releasing/affixing mechanism 41 includes base section 42, pickup section 43, gripping section 46, drive section 48, fixing section 50, and mounting section 52.

Base section 42 is a base portion on which each configuration of releasing/affixing mechanism 41 is disposed. Pickup section 43 is disposed on the lower surface side of base section 42, gripping section 46 is supported by a front portion via drive section 48, fixing section 50 is fixed below pickup section 43 via a stay, and mounting section 52 connected to robot arm 54 is disposed on the upper surface. In addition, a pressure applying device (not illustrated) is connected to base section 42, and negative pressure or positive pressure is supplied from the pressure applying device to base section 42. Base section 42 is freely moved in the up-down direction, the left-right direction, and the front-rear direction by robot arm 54.

Pickup section 43 is disposed on the lower surface side of base section 42 and picks up a part of seal 12. Pickup section 43 is provided with nozzle 44 and suction pipe 45. Nozzle 44 is a member which abuts on seal 12 to apply negative pressure, and is made of rubber or resin into a circular suction cup shape. Nozzle 44 also serves as a pressing member for pressing seal 12 from the top after seal 12 is placed on affixing target 15. Suction pipe 45 is enclosed in base section 42, and is forced out from the inside of base section 42 to the outside when nozzle 44 is lowered. Negative pressure or positive pressure is supplied from the pressure applying device to suction pipe 45 via base section 42. Pickup section 43 is disposed in base section 42 so as to be lifted and lowered between the standby position and a pickup position, is lowered to the pickup position when seal 12 is picked up, and is lifted to the standby position when the pickup is released.

Gripping section 46 grips leading end portion 13 of seal 12 in a state of being pushed up by push-up section 26, and includes a pair of opposing gripping claws 47. Gripping section 46 is disposed in base section 12 so as to be movable in the approaching/separating direction (front-rear direction) approaching and separating from pickup section 43. In addition, gripping section 46 is movable in the up-down direction as base section 42 moves in the up-down direction where the base section 42 is lifted and lowered. As illustrated in FIG. 5, gripping section 46 is disposed obliquely downward so as to be directed toward leading end portion 13 of seal 12 in a state of being lifted from sheet 11. The pair of gripping claws 47 has a width that can be inserted between two first members 31. Gripping claw 47 enters and grips leading end portion 13 pushed up by first member 31 between first members 31. Gripping section 46 is driven by an air actuator or an electromagnetic actuator (not illustrated) into a gripping state where the tip end of gripping claw 47 is closed and a gripping released state where the tip end is opened. Gripping section 46 grips leading end portion 13 of seal 12 in a state of being bent in a curved manner so that the shape of seal 12 as viewed from the side is S-shaped (refer to FIG. 1 and the like).

Drive section 48 moves support member 49 in a direction where gripping section 46 approaches and separates from pickup section 43. Drive section 48 includes an air cylinder driven by the pressure supplied from base section 42. Support member 49 is a member that is connected to drive section 48 so as to be movable in the front-rear direction by drive section 48 and supports gripping section 46 below support member 49.

Fixing section 50 is a member for fixing sheet 11 to placement section 21 on which sheet 11 is placed. As illustrated in FIG. 5, fixing section 50 is a C-shaped plate-like member having an opening in front thereof, and a lower surface thereof is a pressing surface that presses in contact with placement surface 22. From the front to the center of fixing section 50, there is working space 51 through which pickup section 43 passes in the up-down direction and in which gripping section 46 enters rearward. Working space 51 is a space for performing the work of releasing seal 12 from sheet 11 in a state where sheet 11 is fixed to fixing section 50. Seal 12 passes through working space 51 and moves upward together with gripping section 46 and pickup section 43.

Mounting section 52 is a section that can be mounted on and dismounted from robot arm 54, and is disposed on the upper surface of base section 42. Mounting section 52 has a locking mechanism that is locked when releasing/affixing mechanism 41 is mounted on robot arm 54. When an operator removes releasing/affixing mechanism 41 from robot arm 54, the lock mechanism is released.

As illustrated in FIG. 1, robot arm 54 mounts releasing/affixing mechanism 41 on the tip end thereof, releases seal 12 from sheet 11, moves seal 12, and moves releasing/affixing mechanism 41 in the front-rear, left-right, and up-down directions so as to affix seal 12 to affixing target 15. Robot arm 54 includes multiple arms 55 which pivot about a pivot shaft, drive motor 56 which pivotally drives the pivot shaft to which arm 55 is connected, base portion 57 which supports and arranges arm 55, and the like.

Control PC 60 executes control of each device of releasing/affixing system 10. Control PC 60 is provided with protrusion control section 61, processing control section 62, storage section 63, communication section 64, display section 65, and operation device 66. Protrusion control section 61 is configured as a microprocessor centered on the CPU, and controls entire protrusion device 20. Protrusion control section 61 outputs a control signal to lifting and lowering section 28 so as to push up and lower push-up section 26 on the lower surface side of seal 12 as a releasing target. Processing control section 62 is configured as a microprocessor centered on the CPU, and controls entire releasing/affixing device 40. Processing control section 62 outputs drive signals to pickup section 43, gripping section 46, drive section 48, and robot arm 54. Storage section 63 is a large-capacity storage medium such as flash memory, and stores a program for controlling releasing/affixing system 10, information on seal 12, affixing target 15, and the like.

Communication section 64 is an interface for exchanging information with an external device such as protrusion device 20 or releasing/affixing device 40. Each device of releasing/affixing system 10 exchanges information with control PC 60 via communication section 64. Display section 65 is a display for displaying information to an operator. Operation device 66 includes a keyboard, a mouse, and the like for which various inputs are performed by an operator. In releasing/affixing system 10, the control of protrusion device 20 and releasing/affixing device 40 is performed by single control PC 60; however, a control device may be provided in each of protrusion device 20 and releasing/affixing device 40, or each control processing may be shared by three or more control devices.

Figure 7:
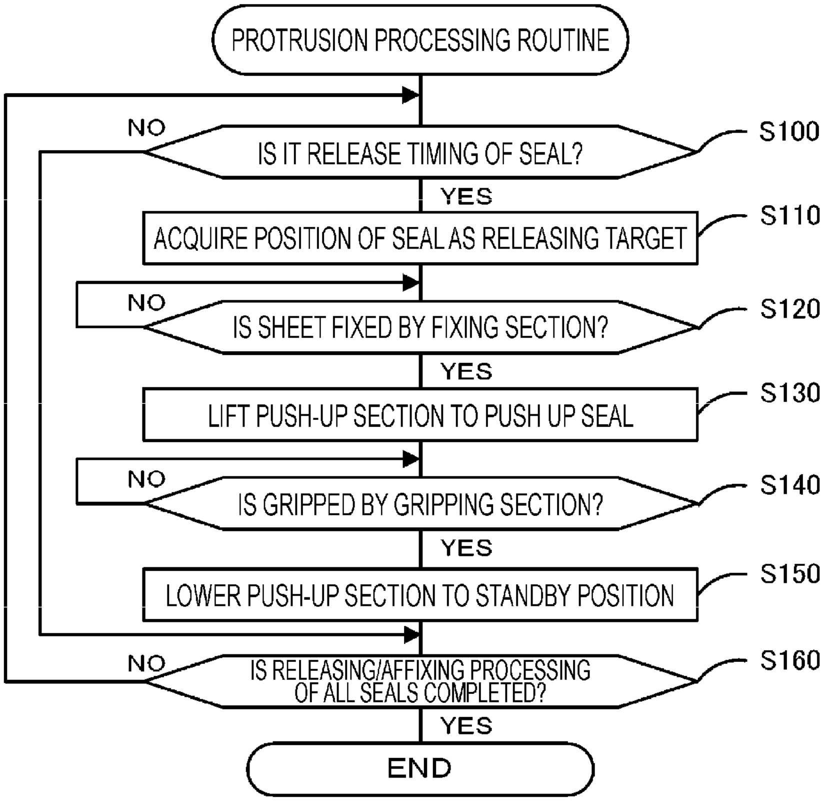
FIG. 7 is a flowchart illustrating an example of a protrusion processing routine.
Figure 8:
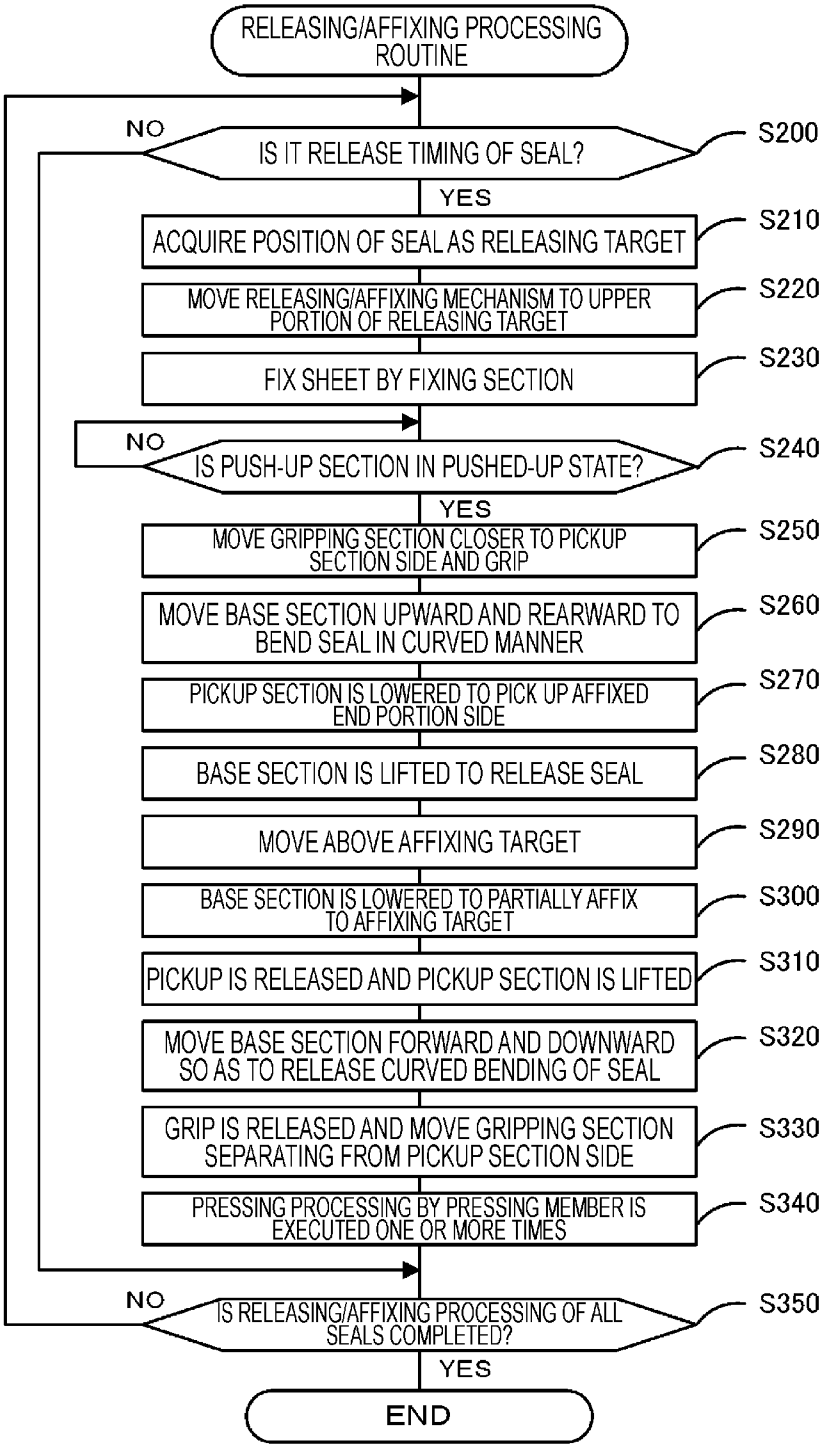
FIG. 8 is a flowchart illustrating an example of a releasing/affixing processing routine.
Figure 9A:
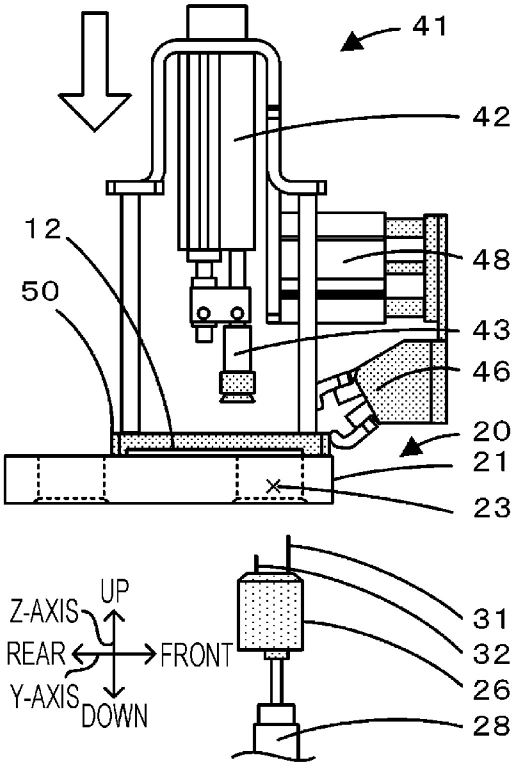
FIG. 9 is an explanatory view of a series of processing for pushing up and gripping leading end portion 13 of seal 12.
Figure 9B:
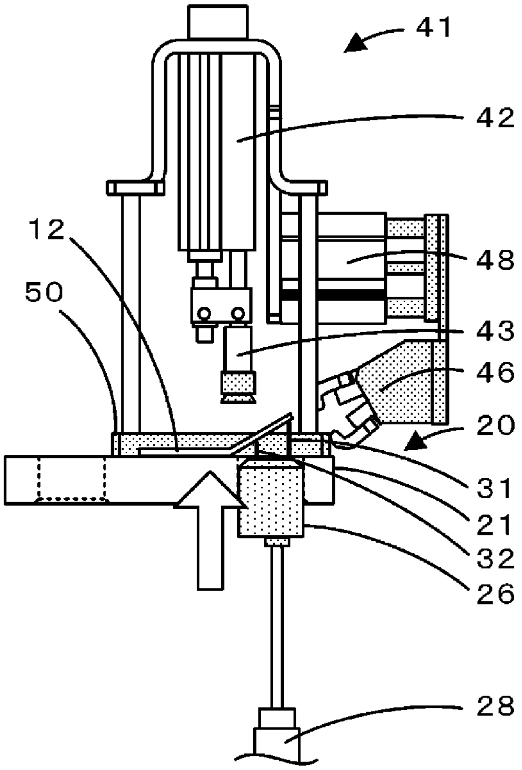
Figure 9C:
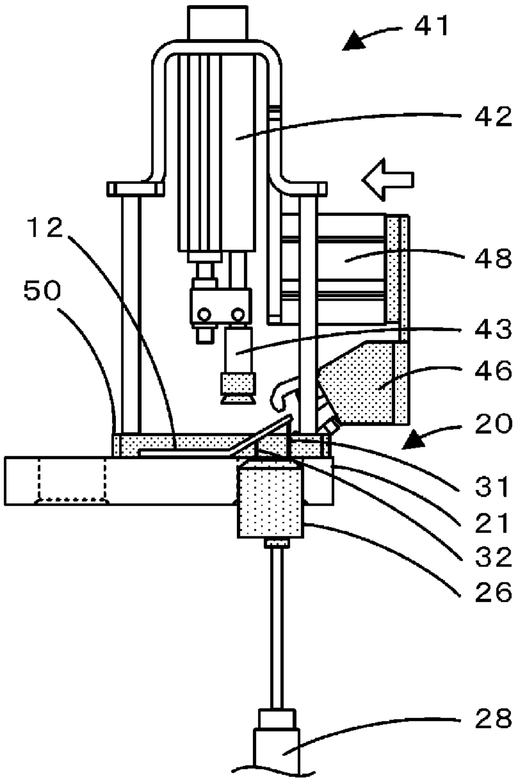
Figure 9D:
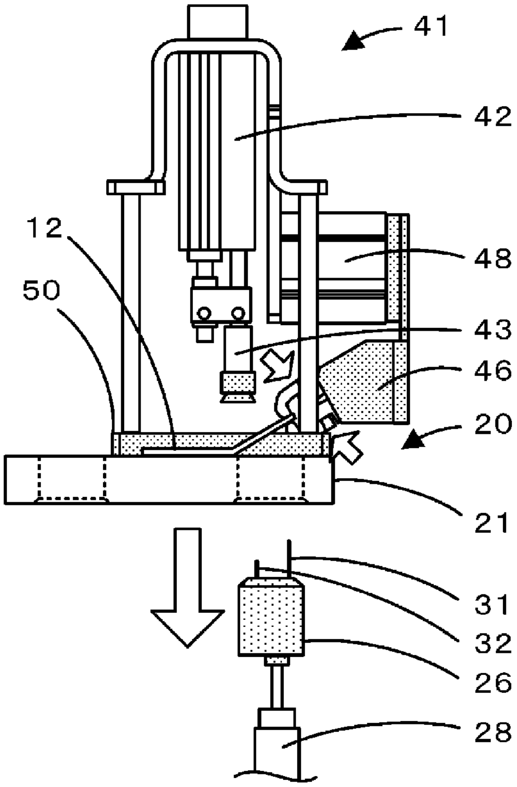
Figure 10A:
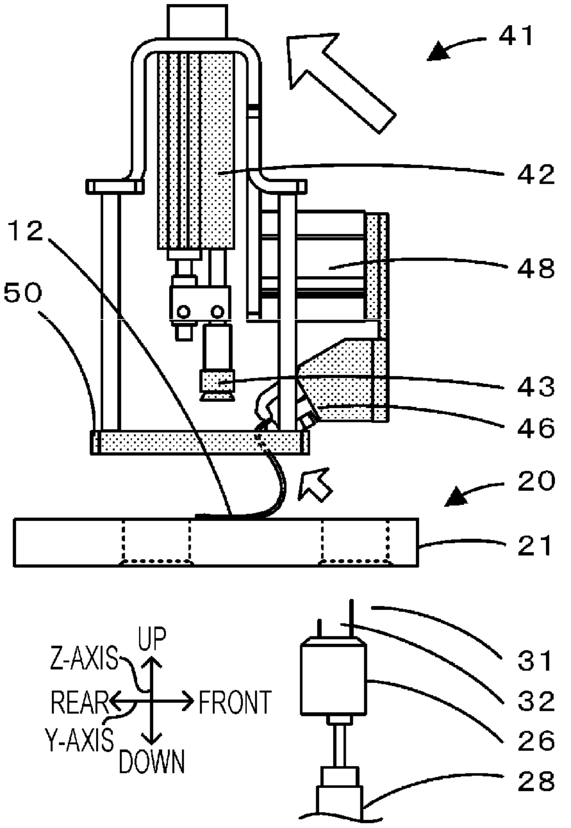
FIG. 10 is an explanatory view of a series of processing for releasing seal 12.
Figure 10B:
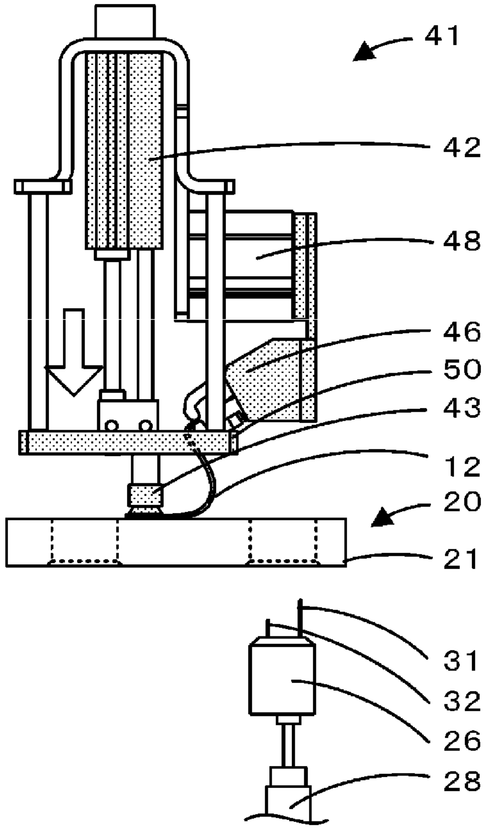
Figure 10C:
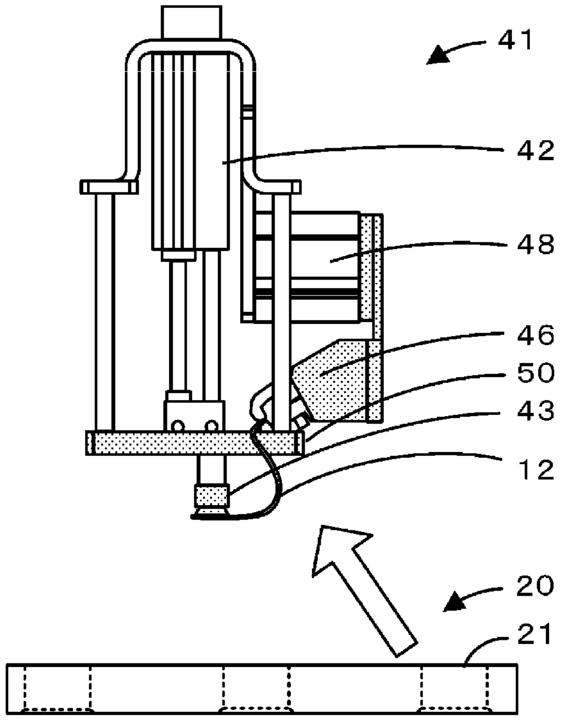
Figure 11A:
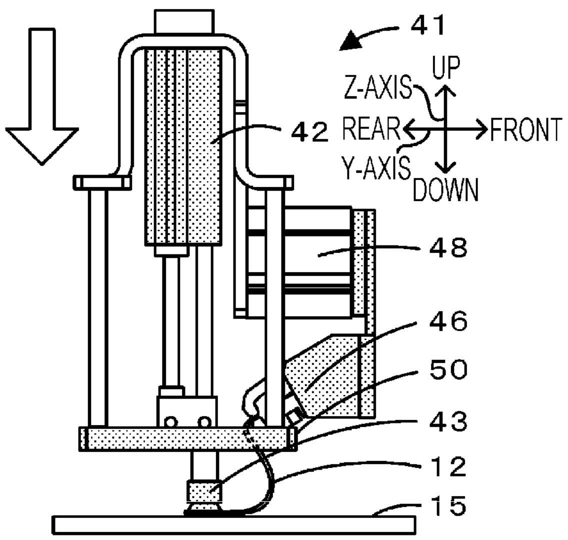
FIG. 11 is an explanatory view of a series of processing for affixing seal 12 to affixing target 15.
Figure 11B:
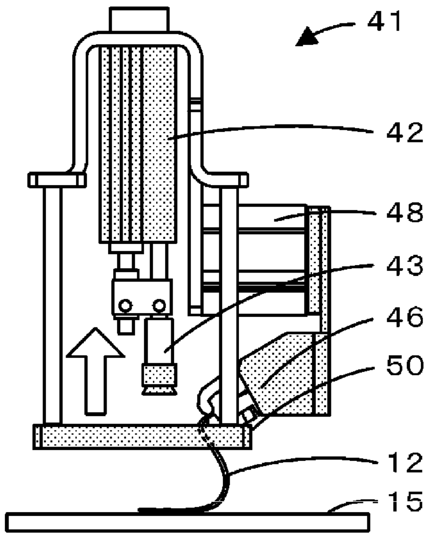
Figure 11C:
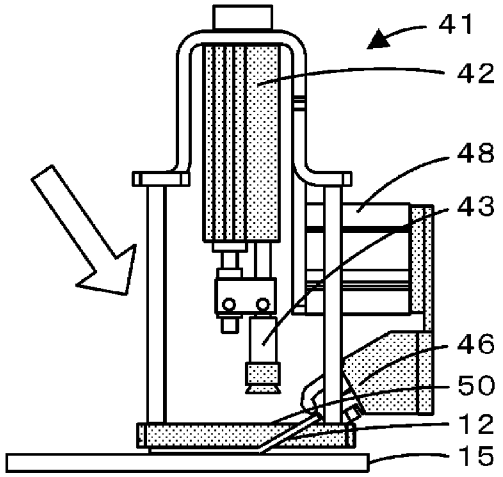
Figure 11D:
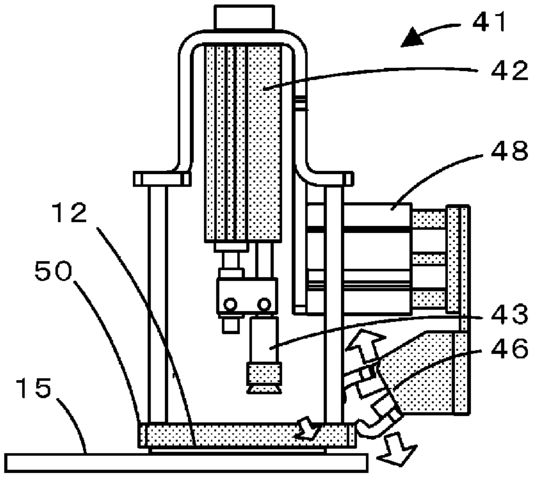
Figure 11E:
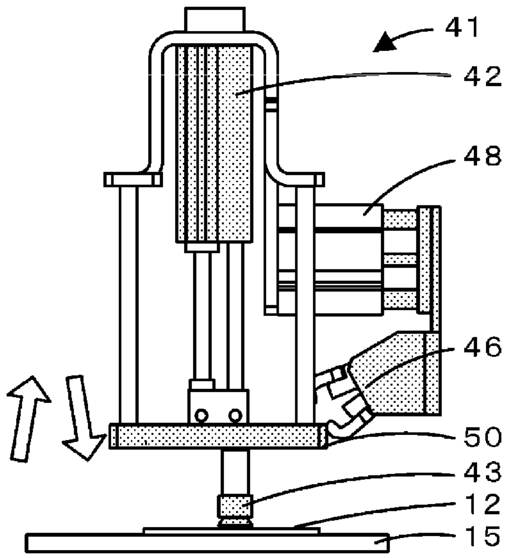
Figure 11F:
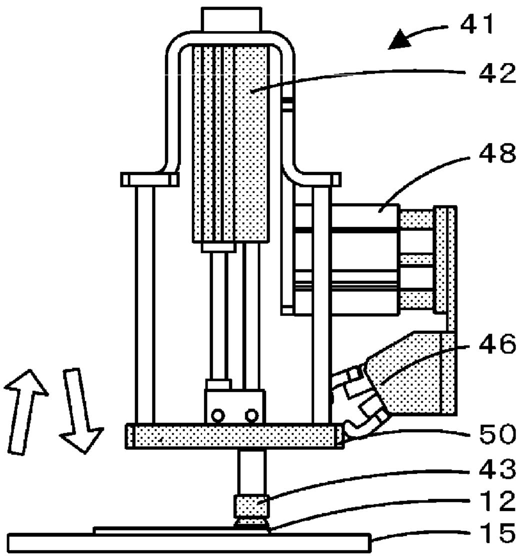

Next, releasing/affixing processing of seal 12 by releasing/affixing system 10 configured in this manner will be described. FIG. 7 is a flowchart illustrating an example of a protrusion processing routine executed by the CPU of protrusion control section 61 and operated by protrusion device 20. FIG. 8 is a flowchart illustrating an example of a releasing/affixing processing routine executed by the CPU of processing control section 62 and operated by releasing/affixing device 40. FIG. 9 is an explanatory view of a series of processing in which leading end portion 13 of seal 12 is pushed up by protrusion device 20 and is gripped by releasing/affixing device 40. FIG. 9A is a view for fixing sheet 11, FIG. 9B is a view in the pushed-up state of seal 12 by push-up section 26, FIG. 9C is a view prepared for gripping of gripping section 46, and FIG. 9D is a view in which seal 12 is gripped by gripping section 46. FIG. 10 is an explanatory view of a series of processing in which releasing/affixing device 40 releases seal 12. FIG. 10A is a view in which seal 12 is bent in a curved manner, FIG. 10B is a view in which a part of seal 12 is picked up by pickup section 43, and FIG. 10C is a view in which seal 12 is released from sheet 11. FIG. 11 is an explanatory view of a series of processing in which releasing/affixing device 40 affixes seal 12 to affixing target 15. FIG. 11A is a view in which a part of seal 12 is affixed to affixing target 15, FIG. 11B is a view in which the pickup is released, FIG. 11C is a view in which the curved bending of seal 12 is released, FIG. 11D is a view in which the grip of seal 12 is released, FIG. 11E is an explanatory view of the first pressing processing, and FIG. 11F is an explanatory view of the second pressing processing.

First, the protrusion processing of seal 12 executed by protrusion device 20 will be described. The protrusion processing routine in FIG. 7 is stored in storage section 63, and is executed after inputting an execution command for affixing processing of seal 12 from the operator. When this routine is started, the CPU of protrusion control section 61 first determines whether it is a release timing of seal 12 (S100). For example, the CPU determines that the release timing is when the preparation on releasing/affixing device 40 side is completed and releasing/affixing device 40 can release new seal 12. When it is determined in S100 that it is the release timing of seal 12, the CPU acquires the position of seal 12 as the releasing target based on the information stored in storage section 63 (S110), and determines whether sheet 11 is fixed by fixing section 50 (S120). For example, the CPU can acquire the position information of releasing/affixing mechanism 41 and the like from releasing/affixing device 40 and execute the determination. When fixing section 50 does not fix sheet 11, the CPU stands by as it is. On the other hand, when fixing section 50 fixes sheet 11 (FIG. 9A), the CPU performs processing of lifting corresponding push-up section 26 and pushing up leading end portion 13 of seal 12 (S130, FIG. 9B). As the condition such as the lifting speed of push-up section 26, for example, a time required for processing of pushing up seal 12 or a condition for preventing breakage of seal 12 may be empirically obtained using seal 12 in advance, and a desirable range may be adopted. Similarly, the operator empirically obtains a desirable range such as the height, the position, the number, and the like of first member 31 or second member 32 of push-up section 26, and uses push-up section 26 having the obtained condition.

Push-up section 26 first pushes up leading end portion 13 of seal 12 by first member 31 formed at height H1 (refer to FIG. 4). When push-up section 26 is lifted, leading end portion 13 of seal 12 is lifted in a state where the end portion on a side opposite to leading end portion 13 is affixed to sheet 11, so that leading end portion 13 is lifted while being displaced in a direction separating from first member 31 in an arc. When push-up section 26 is lifted to a predetermined height, leading end portion 13 is detached from first member 31, but thereafter, second member 32 having height H2 supports the center side of seal 12 to further push up seal 12. In this manner, since the section to be pushed up is changed, in protrusion device 20, leading end portion 13 on one side of seal 12 can be pushed up in a posture easily gripped by gripping section 46 while further suppressing the breakage of seal 12.

When push-up section 26 pushes up leading end portion 13 of seal 12, the CPU determines whether gripping section 46 of releasing/affixing device 40 grips the end portion of seal 12 based on a signal from releasing/affixing device 40 or the like (S140). When leading end portion 13 is not gripped by gripping section 46, the CPU causes push-up section 26 to stand by at the push-up position to which push-up section 26 is lifted (FIG. 9C). On the other hand, when leading end portion 13 of seal 12 is gripped by gripping section 46 in S140, the CPU causes push-up section 26 to be lowered and moved push-up section 26 to the standby position (S150, FIG. 9D). After S150 or when it is not the release timing of seal 12 in S100, the CPU determines whether the releasing/affixing processing of all seals 12 is completed (S160), and repeatedly executes the processing after S100 when there is seal 12 not yet subjected to the releasing/affixing processing. On the other hand, when the releasing/affixing processing of all seals 12 is completed in S160, the CPU ends the routine. In this manner, protrusion device 20 lifts and lowers push-up section 26 to support the release of seal 12.

Next, the releasing, moving, and affixing processing of seal 12 executed by releasing/affixing device 40 will be described. The protrusion processing routine in FIG. 8 is stored in storage section 63, and is executed after inputting the execution command for affixing processing of seal 12 from the operator. When this routine is started, the CPU of processing control section 62 first determines whether it is the release timing of seal 12 (S200). For example, the CPU determines that it is the release timing when the preparation on protrusion device 20 side is completed and protrusion device 20 can thrust new seal 12. When it is determined in S200 that it is the release timing of seal 12, the CPU acquires the position of seal 12 as the releasing target based on the information stored in storage section 63 (S210), and causes releasing/affixing mechanism 41 to move to the upper portion of the releasing target by robot arm 54 (S220). Next, the CPU causes base section 42 to be lowered and fixing section 50 to fix sheet 11 (S230, FIG. 9A). Next, the CPU determines whether push-up section 26 is in a state where leading end portion 13 of seal 12 is pushed up based on the signal from protrusion device 20 (S240). When push-up section 26 is not in a state where seal 12 is pushed up, the CPU stands by as it is. On the other hand, when push-up section 26 is in a state where seal 12 is pushed up, the CPU causes gripping section 46 to move closer to pickup section 43 side (FIG. 9C), and causes gripping section 46 to grip leading end portion 13 of seal 12 (S250, FIG. 9D).

Subsequently, the CPU causes base section 42 to move upward and rearward by robot arm 54 so that seal 12 is bent in a curved manner in the S-shape when viewed from the side (S260, FIG. 10A). At this time, it is preferable that robot arm 54 moves base section 42 so that pickup section 43 can pick up and the area where seal 12 is affixed to sheet 11 is a minimum area. When the area where seal 12 is affixed to sheet 11 is larger, it may be difficult to release seal 12 with the pickup force of pickup section 43. The smaller an affixed area, the more seal 12 can be surely released, which is preferable. At this time, pickup section 43 is located above the end portion of seal 12 affixed to sheet 11. Next, the CPU causes pickup section 43 to be lowered to the pickup position, and the end portion of seal 12 on the side affixed to sheet 11 to be picked up (S270, FIG. 10B). The CPU causes base section 42 to be lifted by robot arm 54 and seal 12 to be released from sheet 11 (S280, FIG. 10C). At this time, it is preferable that the CPU causes base section 42 to move upward and rearward from the viewpoint of more surely releasing seal 12.

Next, the CPU of processing control section 62 causes releasing/affixing mechanism 41 to move above affixing target 15 by robot arm 54 (S290), base section 42 to be lowered, and a part of seal 12 picked up by pickup section 43 to be affixed to affixing target 15 (S300, FIG. 11A). Next, the CPU causes the pickup of pickup section 43 to be released and pickup section 43 to be lifted to the standby position (S310, FIG. 11B). Since a part of seal 12 is fixed on affixing target 15 in S300, seal 12 is stable on affixing target 15 even in this state. Next, the CPU causes robot arm 54 to move base section 42 forward and downward so as to release the S-shaped curved bending of seal 12 (S320, FIG. 11C). Subsequently, the CPU causes the grip of leading end portion 13 by gripping section 46 to be released, and gripping section 46 to be retracted in a direction separating from pickup section 43 (330, FIG. 11D). When leading end portion 13 is released from the gripping state, seal 12 is released from the bent state, is sequentially lowered from a part of the affixed part toward leading end portion 13 side, and is affixed to affixing target 15 in a state where wrinkles are unlikely to be generated. The CPU performs pressing processing of pressing nozzle 44 as a pressing member against seal 12 one or more times (S340). Here, the CPU is assumed that pressing processing is performed at two locations on the center of seal 12 and gripped leading end portion 13 side (FIGS. 11E and 11F). In this manner, releasing/affixing device 40 can release seal 12 from sheet 11 and affix seal 12 to affixing target 15 in a clean state with no wrinkles.

A correspondence relation between configuration elements of the present embodiment and configuration elements of the present disclosure will be clarified. Base section 42 of the present embodiment corresponds to the base section of the present disclosure, pickup section 43 corresponds to the pickup section, gripping section 46 corresponds to the gripping section, drive section 48 corresponds to the drive section, processing control section 62 corresponds to the processing control section, robot arm 54 corresponds to the robot arm, mounting section 52 corresponds to the mounting section, nozzle 44 corresponds to the pressing member, and fixing section 50 corresponds to the fixing section. In addition, push-up section 26 corresponds to the push-up section, placement section 21 corresponds to the placement section, first member 31 corresponds to the first member and the first pin, second member 32 corresponds to the second member and the second pin, lifting and lowering section 28 corresponds to the lifting and lowering section, and protrusion control section 61 corresponds to the protrusion control section.

In releasing/affixing device 40 of the present embodiment described above, pickup section 43 and gripping section 46 are disposed in base section 42, the positional relationship between pickup section 43 and gripping section 46 can be uniquely obtained, and seal 12 can be released, moved, and affixed in a state where a part of seal 12 is picked up and leading end portion 13 of the seal is gripped. Therefore, in releasing/affixing device 40, seal 12 can be more surely moved from affixed sheet 11. In addition, gripping section 46 is disposed obliquely downward so as to be directed toward the end portion of seal 12 in a state of being lifted from sheet 11, and grips the end portion of the seal. In releasing/affixing device 40, gripping section 46 can easily support the end portion of seal 12 by moving along the direction approaching and separating from pickup section 43. Furthermore, gripping section 46 grips the end portion of seal 12 so that the shape of seal 12 as viewed from the side is S-shaped. In releasing/affixing device 40, seal 12 can be easily released from sheet 11, and seal 12 can be more cleanly affixed to affixing target 15 while further suppressing the generation of wrinkles and the like.

In addition, since releasing/affixing device 40 is provided with processing control section 62 that controls pickup section 43, gripping section 46, drive section 48, and robot arm 54, seal 12 as the releasing target can be automatically moved by processing control section 62. Furthermore, mounting section 52 to be mounted on robot arm 54 is disposed in base section 42, and is moved by robot arm 54 in the up-down direction, the front-rear direction, and further in the left-right direction. In releasing/affixing device 40, each base section 42 can be moved in the up-down direction by robot arm 54. In addition, in releasing/affixing device 40, each base section 42 can be moved in the front-rear direction by robot arm 54, in addition to the movement of gripping section 46 by drive section 48. Furthermore, processing control section 62 causes drive section 48 to bring gripping section 46 closer to pickup section 43, causes gripping section 46 to grip leading end portion 13 of seal 12 in a state of being lifted from sheet 11, causes gripping section 46 to be lifted to bend seal 12 in a curved state, thereafter causes pickup section 43 to pick up a part of seal 12, and causes base section 42 to be lifted to release seal 12 from sheet 11. Releasing/affixing device 40 can more surely release seal 12 by such a series of operations.

Furthermore, processing control section 62 causes pickup section 43 to pick up a part of seal 12, causes a part of seal 12 picked up by pickup section 43 to abut on affixing target 15 in a state where seal 12 is bent in a curved manner and leading end portion 13 of seal 12 is gripped by gripping section 46, releases the grip of gripping section 46 to release the curved bent state of the seal, and causes seal 12 to be affixed to affixing target 15. Releasing/affixing device 40 can more surely release seal 12 by such a series of operations. In addition, processing control section 62 causes pickup section 43 to release the pickup on a part of seal 12 before releasing the grip of gripping section 46. While the movement of base section 42 is limited in the pickup maintaining state of pickup section 43, in releasing/affixing device 40, since the degree of freedom in the movement of base section 42 is generated by releasing the pickup, the operation of affixing seal 12 can be more freely performed. Furthermore, after causing a part of seal 12 to abut on affixing target 15, processing control section 62 causes gripping section 46 to move so as to be separated and lower from the position when the seal 12 is abutted, causes the grip of gripping section 46 to be released, and causes drive section 48 to separate gripping section 46 from pickup section 43. In releasing/affixing device 40, seal 12 can be affixed to affixing target 15 more cleanly.

Furthermore, base section 42 includes nozzle 44 as a pressing member for pressing the upper surface of seal 12 affixed to affixing target 15, and processing control section 62 performs an operation of pressing the upper surface of the seal affixed to affixing target 15 by nozzle 44 one or more times after releasing the grip of gripping section 46. In releasing/affixing device 40, by pressing the upper surface of seal 12, the affixing state of seal 12 can be further improved. In addition, since nozzle 44 of pickup section 43 also serves as the pickup and the pressing member of seal 12, the configuration can be further simplified. Furthermore, pickup section 43 is disposed in base section 42 so as to be lifted and lowered between the standby position and the pickup position, moves to the pickup position when a part of seal 12 is picked up, and moves to the standby position when the pickup is released. In the releasing/affixing device, base section 42 can be more freely moved by retracting the pickup section. Furthermore, fixing section 50 that includes working space 51 having pickup section 43 and gripping section 46 and fixes sheet 11 to placement section 21 on which sheet 11 is placed is disposed in base section 42, and processing control section 62 causes seal 12 to be released from sheet 11 in a state where sheet 11 is fixed to fixing section 50. In releasing/affixing device 40, by fixing sheet 11, seal 12 can be more surely released.

In addition, releasing/affixing system 10 that thrusts and releases the seal from the sheet to which one or more seals are affixed, and moves the seal to affix the seal to the affixing target, the system is provided with releasing/affixing device 40 described above, and protrusion device 20 which includes push-up section 26 disposed on the lower surface side of seal 12 and pushing up seal 12, and releases seal 12 from sheet 11 to which one or more seals 12 are affixed, in which gripping section 46 grips the end portion of seal 12 pushed up by protrusion device 20 to release seal 12. Since the releasing/affixing system is provided with above-described releasing/affixing device 40, seal 12 can be more surely moved from affixed sheet 11. Furthermore, in releasing/affixing system 10, protrusion device 20 is provided with placement section 21 for placing sheet 11, push-up section 26 that includes first member 31 disposed on the lower surface side of seal 12 placed on placement section 21 and pushing up leading end portion 13 of seal 12 from below, and second member 32 having height H2 lower than that of first member 31 and located on the center side from leading end portion 13 of seal 12, and pushes up seal 12 to release leading end portion 13 from sheet 11 in a state where a side different from leading end portion 13 of seal 12 is affixed to sheet 11, lifting and lowering section 28 that moves push-up section 26 up and down, and protrusion control section 61 that controls lifting and lowering section 28 so that push-up section 26 on the lower surface side of seal 12 as the releasing target is pushed up and then lowered. In protrusion device 20, a first end portion of seal 12 is affixed to sheet 11, the posture of seal 12 is stabilized, and a second end portion of seal 12 is lifted, so that the end portion of lifted seal 12 is easily gripped. Accordingly, in releasing/affixing system 10, seal 12 can be more surely moved from affixed sheet 11.

Furthermore, in releasing/affixing system 10, protrusion control section 61 causes push-up section 26 to be lifted to push up the end portion of seal 12, and causes push-up section 26 to be lowered after gripping section 46 grips the end portion of seal 12, and processing control section 62 causes gripping section 46 to move to the end portion of seal 12 after push-up section 26 pushes up the end portion of seal 12, and causes gripping section 46 to grip the end portion. In releasing/affixing system 10, the end portion of the seal can be more surely gripped. In addition, in releasing/affixing system 10, a fixing section that includes working space 51 having pickup section 43 and gripping section 46 and fixes the sheet to the placement section on which sheet 11 is placed may be disposed in base section 42, and the protrusion control section may lift the push-up section to push up the end portion of the seal after the fixing section fixes the sheet. In releasing/affixing system, the end portion of the seal can be more surely released.

The releasing/affixing device and the releasing/affixing system of the present disclosure are not limited to the embodiment described above, and it goes without saying that the releasing/affixing device and the releasing/affixing system can be implemented in various aspects without departing from the technical scope of the present disclosure.

For example, in the above-described embodiment, gripping section 46 is disposed obliquely downward so as to be directed toward the end portion of seal 12 in a state of being lifted from sheet 11; however, the configuration is not limited to this, and the direction thereof is not particularly limited as long as leading end portion 13 of seal 12 can be gripped. When gripping section 46 is disposed obliquely downward, gripping claw 47 can face the upper surface and the lower surface of leading end portion 13 of seal 12 only by the movement in the front-rear direction, which is preferable.

In the above-described embodiment, gripping section 46 grips leading end portion 13 of seal 12 so that the shape of seal 12 is S-shaped when viewed from the side surface, together with the pickup of pickup section 43; however, the configuration is not limited to this, and the shape of seal 12 is not limited to the S-shape as long as the shape of seal 12 is bent in a curved shape and gripped. When gripping section 46 bends seal 12 in an S-shape and grips seal 12, it is good from the viewpoint of more cleanly affixing seal 12 because seal 12 is stuck on the upper surface of affixing target 15 in order from the portion where seal 12 is partially affixed by abutting pickup section 43 when seal 12 is affixed to affixing target 15.

In the above-described embodiment, releasing/affixing device 40 freely moves base section 42 by robot arm 54; however, the configuration is not limited to this, and may be, for example, a head on which releasing/affixing mechanism 41 is mounted and an XY robot provided with multiple sliders. In this releasing/affixing device, base section 42 can be moved by the XY robot.

In the above-described embodiment, processing control section 62 causes pickup section 43 to pick up a part of the seal after seal 12 is bent in a curved manner in the processing of releasing seal 12 (FIG. 10B); however, the configuration is not limited to this, and may cause pickup section 43 to pick up a part of the seal before seal 12 is bent in a curved manner. In releasing/affixing device 40, it is possible to further ensure an affixing state of a part of seal 12. From the viewpoint of the degree of freedom in the movement of base section 42, it is preferable to pick up a part of the seal to pickup section 43 after seal 12 is bent in a curved manner.

In the above-described embodiment, when seal 12 is affixed to affixing target 15, processing control section 62 releases the pickup of pickup section 43 and lifts pickup section 43 to the standby position immediately after affixing a part of seal 12 to affixing target 15 by pickup section 43; however, the configuration is not limited to this, and the processing of releasing the grip of gripping section 46 may be performed in a state where the pickup state of pickup section 43 is maintained. In releasing/affixing device 40, a sticking state of the end portion of seal 12 can be further maintained.

In the above-described embodiment, when seal 12 is affixed to affixing target 15, processing control section 62 moves base section 42 downward and forward and releases the grip of gripping section 46 after the curved bending of seal 12 is released; however, the configuration is not limited to this, and the movement of base section 42 may be omitted to release the grip of gripping section 46. It is preferable that processing control section 62 moves base section 42 downward and forward from the viewpoint of making the affixing state cleaner.

In the above-described embodiment, processing control section 62 executes the pressing processing using nozzle 44 as the pressing member; however, the configuration is not limited to this, and for example, fixing section 50 may be used as the pressing member, or a pressing member dedicated to the pressing processing may be disposed on base section 42, and the pressing processing may be executed using the pressing member. Even with releasing/affixing device 40, seal 12 can be affixed to affixing target 15 in a state where the finish is good.

In the above-described embodiment, releasing/affixing system 10 pushes up leading end portion 13 of seal 12 by protrusion device 20 including push-up section 26 on which first member 31 and second member 32 are disposed; however, the configuration is not limited to this as long as releasing/affixing system 10 has a push-up section capable of pushing up leading end portion 13 of seal 12. For example, first member 31 and second member 32 have the pin shapes; however, the configuration is not limited to this as long as first member 31 and second member 32 have shapes capable of pushing up seal 12.

For example, in the above-described embodiment, push-up section 26 is provided with first member 31 and second member 32 having a height such that seal 12 is linearly inclined from a first end side of seal 12 as a starting point to a position where a second end side of seal 12 is higher; however, the configuration is not limited to this as long as leading end portion 13 of seal 12 can be pushed up, and seal 12 may be one that is not linear or inclined.

In the above-described embodiment, push-up section 26 is provided with first member 31 and second member 32 at a height and a position where second member 32 pushes up seal 12 from the lower surface side at a timing when leading end portion 13 of seal 12 is detached from first member 31 when push-up section 26 is lifted; however, the configuration is not limited to this. For example, leading end portion 13 of seal 12 may be one that is not detached from first member 31. From the viewpoint of protecting seal 12, it is preferable that second member 32 pushes up seal 12 from the lower surface side at a timing when leading end portion 13 of seal 12 is detached from first member 31 in push-up section 26.

In the above-described embodiment, first member 31 is two first pins; however, the configuration is not particularly limited to two first pins, and may be one or more first pins. In addition, second member 32 is two second pins; however, the configuration is not particularly limited to two second pins, and may be one or more second pins.

In the above-described embodiment, introduction surface 25 for guiding push-up section 26 is formed on opening edge 24 of at least a part of opening section 23; however, introduction surface 25 may be omitted. At this time, it is preferable that tapered surface 33 is formed on push-up section 26. In addition, in the above-described embodiment, tapered surface 33 in contact with opening edge 24 is formed at the upper end portion of push-up section 26; however tapered surface 33 may be omitted. At this time, it is preferable that introduction surface 25 is formed on opening edge 24. In addition, both introduction surface 25 of opening section 23 and tapered surface 33 of push-up section 26 may be omitted.

Figure 12:
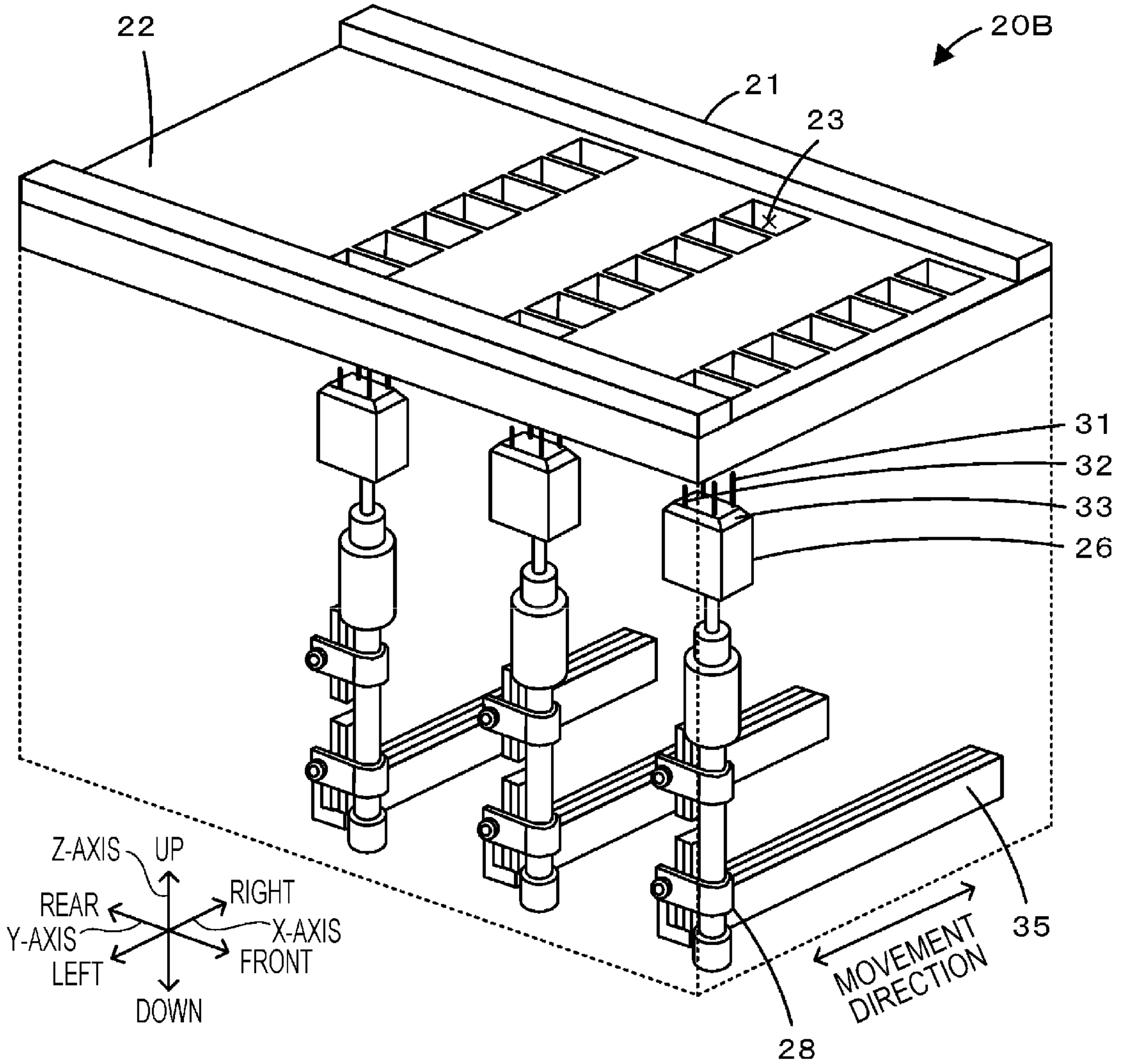
FIG. 12 is an explanatory view illustrating an example of another protrusion device 20B.

In the above-described embodiment, protrusion device 20 is provided with push-up section 26 on each lower surface of seal 12 (refer to FIG. 1); however, the configuration is not limited to this, and for example, as illustrated in FIG. 12, protrusion device 20B provided with moving section 35 that moves push-up section 26 toward the lower surface side of seal 12 as the releasing target may be used. FIG. 12 is an explanatory view illustrating an example of another protrusion device 20B. Protrusion device 20B is provided with one push-up section 26 for each row of seals 12 and moving section 35 that moves lifting and lowering section 28 in the row direction. Moving section 35 is a slider that fixes lifting and lowering section 28 and slides in a predetermined movement direction. In protrusion device 20B, the left-right direction is defined as the movement direction. In protrusion device 20B, by moving push-up section 26, seal 12 as the releasing target can be pushed up, and the number of push-up section 26 and lifting and lowering section 28 can be further reduced, so that the configuration can be further simplified, and the seal can be pushed up. Also, protrusion device 20B is provided with push-up section 26 and lifting and lowering section 28 for each row; however, a moving section having a movement direction in the front-rear direction may be provided, and the number of push-up section 26 and lifting and lowering section 28 may be reduced.

Example

Hereinafter, an example in which releasing/affixing device 40 of the present disclosure is specifically manufactured will be described. Here, the operation conditions of releasing/affixing device 40 and the result of examining an example of the affixing state of seal 12 will be described. This example is merely an example, and the present disclosure is not limited to the present example at all, and it goes without saying that the example can be implemented in various aspects without departing from the technical scope of the present disclosure.

A release test of the seal was performed using releasing/affixing device 40. In the release of seal 12, the pad diameter, the release direction, the release speed, the pickup position, and the release height of nozzle 44 were examined. The size of the seal to be released was 12 mm×52 mm. The pad diameter had a success rate of 50% for a small diameter of 8 mm with respect to the width of the seal, whereas a success rate of 90% for a diameter of 10 mm. It was obtained that the success rate is increased by changing the amount of lifted and released in advance, the release speed, the pickup position, and the like. The seal could be released even when the release direction was the oblique direction; however, the vertical lifting caused less air leakage in the pickup section, which was preferable. The seal could be released even when the release speed is high and low. In the pickup position, it was good to pick up the leading end side of the seal from the viewpoint of increasing the pre-releasing amount and the relationship with the adhesive force of the affixing section. The release height refers to the height of gripping section 46 in FIGS. 10A and 10B. It was obtained that the higher the release height, the larger the pre-releasing amount, and the higher the success rate of the release. It was obtained that the conditions of the pad diameter, the release direction, and the release height of nozzle 44 were more important for the release of seal 12 (refer to FIG. 10C).

INDUSTRIAL APPLICABILITY

The present disclosure can be used in the technical field of automatically affixing a seal to an article.

REFERENCE SIGNS LIST

10: releasing/affixing system, 11: sheet, 12: seal, 13: leading end portion, 15: affixing target, 20, 20B: protrusion device, 21: placement section, 22: placement surface, 23: opening section, 24: opening edge, 25: introduction surface, 26: push-up section, 28: lifting and lowering section, 31: first member, 32: second member, 33: tapered surface, 35: moving section, 40: releasing/affixing device, 41: releasing/affixing mechanism, 42: base section, 43: pickup section, 44: nozzle, 45: suction pipe, 46: gripping section, 47: gripping claw, 48: drive section, 49: support member, 50: fixing section, 51: working space, 52: mounting section, 54: robot arm, 55: arm, 56: drive motor, 57: base portion, 60: control PC, 61: protrusion control section, 62: processing control section, 63: storage section, 64: communication section, 65: display section, 66: operation device, H1, H2: height.

The invention claimed is:

1. A releasing/affixing device configured to move a seal from a sheet to which one or more seals are affixed, the device comprising:

a base section;

a pickup section disposed in the base section and configured to pick up a part of the seal;

a gripping section disposed in the base section to be movable in a direction approaching and separating from the pickup section, configured to be movable in an up-down direction where the base section is lifted and lowered, and configured to grip a top and a bottom of the seal at an end portion of the seal; and a drive section configured to drive the gripping section in the direction approaching and separating from the pickup section.

2. The releasing/affixing device according to claim 1, wherein the gripping section is disposed obliquely downward so as to be directed toward the end portion of the seal in a state of being lifted from the sheet, and grips the end portion of the seal.

3. The releasing/affixing device according to claim 1, wherein the gripping section grips the end portion of the seal so that a shape of the seal as viewed from a side is S-shaped.

4. The releasing/affixing device according to claim 1, further comprising:

a processing control section configured to control the pickup section, the gripping section, and the drive section.

5. The releasing/affixing device according to claim 4, wherein a mounting section configured to be mounted on a robot arm is disposed in the base section, the processing control section also controls the robot arm, and the base section moves in the up-down direction and a front-rear direction by the robot arm.

6. The releasing/affixing device according to claim 4, wherein the processing control section causes the drive section to bring the gripping section closer to the pickup section and the gripping section to grip the end portion of the seal in a state of being lifted from the sheet, causes the gripping section to be lifted to bend the seal in a curved manner, causes the pickup section to pick up a part of the seal before the seal is bent in a curved manner or after the seal is bent in a curved manner, and causes the base section to be lifted to release the seal from the sheet.

7. The releasing/affixing device according to claim 4, wherein the processing control section causes the pickup section to pick up a part of the seal, causes a part of the seal picked up by the pickup section to abut on an affixing target in a state where the seal is bent in a curved manner and the end portion of the seal is gripped by the gripping section, releases the grip of the gripping section to release a curved bent state of the seal, and causes the seal to be affixed to the affixing target.

8. The releasing/affixing device according to claim 7, wherein the processing control section causes the pickup section to release the pickup on a part of the seal before releasing the grip of the gripping section.

9. The releasing/affixing device according to claim 7, wherein after causing a part of the seal to abut on the affixing target, the processing control section causes the gripping section to move so as to be separated and lowered from a position when being abutted, causes the grip of the gripping section to be released, and causes the drive section to separate the gripping section from the pickup section.

10. The releasing/affixing device according to claim 7, wherein the base section includes a pressing member configured to press an upper surface of the seal affixed to the affixing target, and the processing control section performs an operation of pressing the upper surface of the seal affixed to the affixing target by the pressing member one or more times after releasing the grip of the gripping section.

11. The releasing/affixing device according to claim 1, wherein the pickup section is disposed in the base section so as to be lifted and lowered between a standby position and a pickup position, moves to the pickup position when a part of the seal is picked up, and moves to the standby position when the pickup is released.

12. The releasing/affixing device according to claim 1, wherein a fixing section is disposed in the base section, the fixing section including a working space having the pickup section and the gripping section, and being configured to fix the sheet to a placement section on which the sheet is placed, and the seal is released from the sheet in a state where the sheet is fixed to the fixing section.

13. A releasing/affixing system configured to thrust and release a seal from a sheet to which one or more seals are affixed, and configured to move the seal to affix the seal to an affixing target, the system comprising:

the releasing/affixing device according to claim 1; and a protrusion device including a push-up section disposed on a lower surface side of the seal and configured to push up the seal, and configured to release the seal from the sheet to which one or more seals are affixed, wherein the gripping section grips the end portion of the seal pushed up by the protrusion device to release the seal.

14. The releasing/affixing system according to claim 13, wherein the protrusion device includes:

a placement section configured to place the sheet;

the push-up section including a first member and a second member, the first member being disposed on the lower surface side of the seal placed on the placement section and pushing up a leading end portion of the seal from below, the second member having a height lower than that of the first member and being located on a center side from the leading end portion of the seal, and the push-up section being configured to push up the seal to release the end portion from the sheet in a state where a side different from the leading end portion of the seal is affixed to the sheet;

a lifting and lowering section configured to move the push-up section up and down; and a protrusion control section configured to control the lifting and lowering section so that the push-up section on the lower surface side of the seal as a releasing target is pushed up and then lowered.

15. The releasing/affixing system according to claim 14, wherein the protrusion control section causes the push-up section to be lifted to push up the end portion of the seal, and causes the push-up section to be lowered after the gripping section grips the end portion, and a processing control section causes the gripping section to move to the end portion of the seal after the push-up section pushes up the end portion of the seal, and causes the gripping section to grip the end portion.

16. The releasing/affixing system according to claim 14, wherein a fixing section is disposed in the base section, the fixing section including a working space having the pickup section and the gripping section, and being configured to fix the sheet to the placement section on which the sheet is placed, and the protrusion control section causes the push-up section to be lifted to push up the end portion of the seal after the fixing section fixes the sheet.

* * * * *